(12) United States Patent
Hastings et al.

(10) Patent No.: US 9,316,148 B1
(45) Date of Patent: Apr. 19, 2016

(54) ANTI-RATTLE GEOMETRY FOR WASTE GATE LINKAGES USING PRELOADING TECHNOLOGIES TO REDUCE WEAR

(71) Applicant: BorgWarner Inc., Auburn Hills, MI (US)

(72) Inventors: Sean Hastings, Arden, NC (US); Ryan Howell, Hendersonville, NC (US); Matt King, Arden, NC (US); Steven Cagle, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/593,667

(22) Filed: Jan. 9, 2015

(51) Int. Cl.
*F02B 37/18* (2006.01)
*F01D 17/10* (2006.01)

(52) U.S. Cl.
CPC ............ *F02B 37/186* (2013.01); *F01D 17/105* (2013.01); *F05B 2220/40* (2013.01)

(58) Field of Classification Search
CPC ....... Y02T 10/144; F02B 37/00; F02B 37/18; F02B 37/183; F02B 37/186; F05B 2220/40; F01D 17/105
See application file for complete search history.

(56) References Cited

U.S. PATENT DOCUMENTS

| | | | |
|---|---|---|---|
| 8,205,448 B2 * | 6/2012 | Koch et al. | 60/602 |
| 8,869,527 B2 * | 10/2014 | Werstat et al. | 60/602 |
| 2010/0021094 A1 * | 1/2010 | Kaufman et al. | 384/209 |
| 2012/0055154 A1 * | 3/2012 | Ebert | 60/602 |
| 2012/0292547 A1 * | 11/2012 | Kierat et al. | 251/231 |
| 2012/0317975 A1 | 12/2012 | Schoenherr et al. | |

FOREIGN PATENT DOCUMENTS

DE 102007018618 A1 * 10/2007

OTHER PUBLICATIONS (English Translation) DE 102007018618 A1, Oct. 2007, Germany, Stilgenbauer et al.*

* cited by examiner

*Primary Examiner* — Craig Kim
*Assistant Examiner* — Brian P Wolcott
(74) *Attorney, Agent, or Firm* — BrooksGroup

(57) ABSTRACT

A turbocharger assembly is disclosed with a connected lever. An actuator may be spaced away from the lever. An arm may extend from the actuator and may be connected to the lever by a preloaded joint. The joint may include a pin fixed to the lever or the arm. An opening may be provided in the lever or the arm to which the pin is not fixed. The pin may have a shaped section that matches the shape of the opening to provide selected degrees of freedom. A spring element may be engaged in the groove and may apply a force to the pin compensating for wear between the pin and the mating surface by pulling the pin into the opening under the force.

5 Claims, 1 Drawing Sheet

ANTI-RATTLE GEOMETRY FOR WASTE GATE LINKAGES USING PRELOADING TECHNOLOGIES TO REDUCE WEAR

TECHNICAL FIELD

The field to which the disclosure generally relates includes turbochargers for use with internal combustion engines and more particularly, includes linkages for interconnecting turbocharger elements.

BACKGROUND

Turbochargers may be employed with internal combustion engines to pre-charge combustion air. A turbocharger system may include a compressor wheel driven by a turbine wheel. The turbine wheel may be connected to the compressor wheel by a common shaft that is supported for rotation by bearings. Rotation of the turbine wheel drives the compressor wheel through the common shaft to charge the combustion air. The turbocharger's wheels and the connected shaft may rotate at speeds that approach hundreds of thousands of revolutions per minute. In addition, the turbine wheel operates in a high temperature exhaust gas environment, wherein heat may be transferred to the other turbocharging system components. Under these harsh, and increasingly demanding operating conditions, the turbocharging system components are expected to operate for a lifespan of many years and continue to function with the engine to which the system is applied. To perform as expected, the design of the turbocharging system components must be robust to survive as expected, while still being cost effective.

SUMMARY OF ILLUSTRATIVE VARIATIONS

A number of variations may involve a turbocharger assembly with a connected lever. An actuator may be spaced away from the lever. An arm may extend from the actuator and may be connected to the lever by a preloaded joint. The joint may include a pin fixed to the lever or the arm. An opening may be provided in the other of the lever or the arm to which the pin is not fixed. The pin may have a shaped section that matches the shape of the opening to provide selected degrees of freedom. A spring element may be engaged with the pin and may apply a force compensating for wear between the pin and the mating surface, by pulling the pin into the opening under the force.

Other illustrative variations within the scope of the invention will become apparent from the detailed description provided herein. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figures 1, 2:
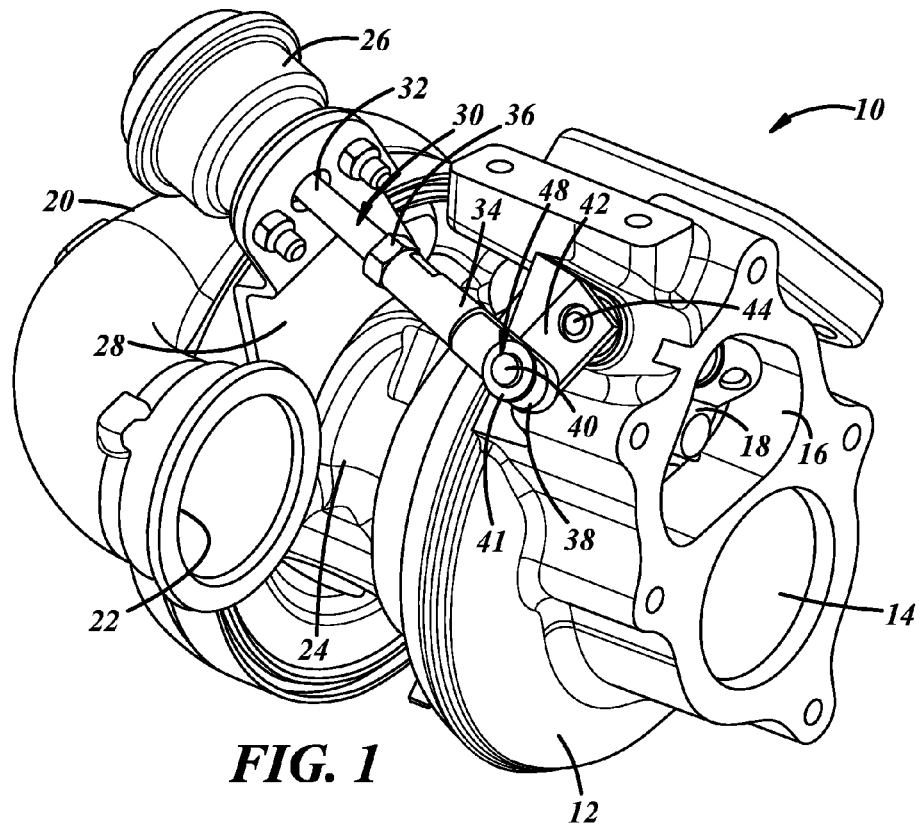
FIG. 1 is a perspective illustration of part of a turbocharger system according to a number of variations.
FIG. 2 is a schematic cross sectional illustration of a preloaded joint according to a number of variations.

The following description of the variations is merely illustrative in nature and is in no way intended to limit the scope of the invention, its application, or uses.

The relevant part of a turbocharger system 10 for a number of variations is illustrated in FIG. 1. A turbine housing 12 may define an exhaust gas flow path 14 that is directed at a turbine to induce rotation and may then be routed out of the turbine housing 12 to an exhaust system that may be connected to the turbine housing 12. The turbine housing 12 may also define an alternate exhaust gas flow path 16 that may be controlled by a valve plate 18 and that may serve as a waste gate for the turbine. A compressor housing 20 may contain a wheel that is connected to the turbine by a shaft. The compressor housing 20 may be configured to collect air and gases from the wheel and channel them through an outlet 22 and on to an engine intake system that may be connected to the outlet 22. The compressor housing 20 may be connected to the turbine housing 12 by a central housing 24 that may rotatably support the shaft that connects the turbine to the compressor wheel.

An actuator 26 may be mounted near the compressor housing 20, on a bracket 28. The bracket 28 may be connected to the central housing 24 or to the compressor housing 20. An arm 30 may extend from the actuator 26 toward the turbine housing 12. The arm 30 may include a first segment 32 and a second segment 34, with its length adjustable with a nut 36. The arm 30 may include an end 38 with an opening through which a pin 40 extends. The pin may be retained in the opening of the arm by a spring 41. The pin 40 may be connected to a lever 42, which may be connected to a rotatable shaft 44. The shaft 44 may extend into the turbine housing 12 and may be connected to the valve plate 18. As a result, translation of the arm 30 by the actuator 26 rotates the lever 42 through the joint 48, thereby rotating the valve plate 18 to selectively open and close the flow path 16.

Referring to FIG. 2 a cross sectional illustration is shown of a joint 50, the details of which may be used for the joint 48 shown in FIG. 1. A lever 52 may be connected to a pin 54. The pin 54 may have a shaped section such as a frustoconical section 56. The section 56 may include a base 58 having a base diameter and may include a terminus 60 having a terminus diameter that is smaller than the base diameter. A first cylindrical section 62 of the pin 54 may extend from the base 58 and may have a diameter that is larger than the base diameter. A second cylindrical section 64 of the pin 54 may extend from the terminus 60 and may have a diameter that is equal to the diameter of the terminus diameter. An annular groove 68 may be formed in the second cylindrical section 64 around its circumference.

An arm 70 may have a first side 72 and an opposite second side 74. An opening 76 may extend through the arm 70. The opening 76 may taper from a larger diameter at the first side 72 to a smaller diameter at the second side 74 and may extend through the arm 70 with a shaped wall such as a conical wall 79 defining the opening 76. The frustoconical section 56 may extend through the opening 76 mating with the conical wall 79. The shape of the mating section and wall may be modified to allow the desired degrees of freedom. For example, if pivoting of the joint 50 is desirable the shape may be spherical in nature. The frustoconical section 56 may extend beyond the first side 72 and out of the opening 76 so that the first cylindrical section 62 is spaced away from the first side 72 of the arm 70. On the opposite side of the wall 70, the pin 54 may extend out of the opening 76 so that the annular groove 68 is spaced away from the second side 74 of the wall 70. A spring element 80 may have an inner periphery 82 captured in the annular groove 68 and may have an outer periphery 84 applying force to the second side 74 of the arm 70. As a result, the spring element 80 applies a preload force to pull the pin 54 into the opening 76 and to maintain the connection of joint 50.

The joint 50 allows the lever 52 and pin 54 to rotate relative to the arm 70 permitting the translation of the arm 70 to effect rotation of the lever 52. In the application of FIG. 1, this will result in rotation of the shaft 44 and the valve plate 18. Over time wear may develop in the surfaces of the pin 54 and the surfaces of the arm 70 that engage with each other and interact. As this occurs, clearance that might otherwise result between the conical wall 79 and the frustoconical section 56 is automatically eliminated as the spring element 80 pulls the pin 54 deeper into the opening 76. This may occur until the first cylindrical section 62 engages the first side 72 of the arm 70 acting as a stop. The stop action may be designed to maintain the joint 50 within the bandwidth of the spring effect, so that it is not surpassed, and the spring element 80 will continue to apply force between the pin 54 and the arm 70. Maintaining the spring force and loaded contact between the pin 54 and the arm 70 acts to maintain the individual components synchronous when incurring vibratory excitation. Constraining relative movement can reduce wear between the arm and the pin. Materials for the component parts including the pin 54 and the arm 70, in the area of the conical wall 79, may include a carbon element such as graphite, or other self-lubricating constituent products that can be released by wear.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a turbocharger assembly with a rotatably connected lever. An actuator may be spaced away from the lever. An arm may extend from the actuator and may be connected to the lever by a preloaded joint. The preloaded joint may include a pin permanently fixed to one of the lever and the arm. An opening may be provided in an other of the lever and the arm to which the pin is not permanently fixed. The pin may have a shaped section with a base that may have a first diameter and a terminus that may have a second diameter that is smaller than the first diameter. A cylindrical section of the pin may extend from the terminus. An annular groove may be formed in the cylindrical section. The opening may be defined by a shaped wall that matches the shaped section. The pin may extend through the opening so that the shaped section may rotatably engage the shaped wall. A spring element may be engaged in the groove and may apply a force pulling the pin into the opening. This may compensate for wear between the pin and the shaped wall by pulling the pin into the opening under the force.

Variation 2 may include a turbocharger assembly that may include a turbine housing. A lever may be rotatably connected to the turbine housing. A compressor housing may be connected in the turbocharger assembly. An actuator may be spaced away from the lever and may be disposed near the compressor housing. An arm may extend from the actuator and may be connected to the lever by a preloaded joint. The preloaded joint may include a pin permanently fixed to one of the lever and the arm. An opening may be provided in an other of the lever and the arm which is not permanently fixed to the pin. The pin may have a frustoconical section with a base having a first diameter and with a terminus having a second diameter that is smaller than the first diameter. A first cylindrical section of the pin may extend from the base and may have a diameter larger than the first diameter. A second cylindrical section of the pin may extend from the terminus. An annular groove may be formed in the second cylindrical section. The opening may be defined by a conical wall. The pin may extend through the opening so that the frustoconical section may rotatably engage the conical wall. A spring element may be engaged in the groove and may apply a force pulling the pin into the opening. This may compensate for wear between the pin and the conical wall by pulling the pin into the opening under the force. The pin may progressively move into the opening to compensate for wear until the first cylindrical section stops movement of the pin into the opening.

Variation 3 may include a turbocharger assembly and may include a turbine housing defining a first flow path and a second flow path bypassing at least a part of the first flow path. A valve damper may control flow through the second flow path. A valve shaft may be connected to the valve damper and may extend out of the turbine housing. A lever may be connected to the valve shaft. A pin may be connected to the lever. The pin may have a frustoconical section with a base that has a first diameter and with a terminus that has a second diameter that is smaller than the first diameter. A cylindrical section of the pin may extend from the terminus. An annular groove may be formed in the cylindrical section. An actuator may be mounted on the turbocharger assembly. An arm may extend from the actuator and may have an end. A conical opening may be formed in the arm near the end. The conical opening may be tapered through the arm. The pin extends through the conical opening so that the frustoconical section may engage the arm throughout the opening. A spring element may be engaged in the groove and may engage the arm. The spring may apply a force pulling the pin into the opening, compensating for wear between the pin and the arm by maintaining contact between the pin and the arm under the force.

Variation 4 may include a turbocharger assembly as set forth in variation 3 wherein the pin rotates in the opening.

Variation 5 may include a turbocharger assembly as set forth in any of variations 3 through 4 wherein the frustoconical section may match the conical opening to maximize contact between the pin and the arm in the conical opening.

Variation 6 may include a turbocharger assembly as set forth in any of variations 3 through 5 wherein the spring may be compressed between the arm and the pin at the groove.

Variation 7 may include a turbocharger assembly as set forth in any of variations 3 through 6 wherein the pin may include a stop section and wherein the pin may progressively move into the conical opening to compensate for wear until the stop section engages the arm which stops movement of the pin into the opening.

Variation 8 may include a turbocharger assembly as set forth in any of variations 3 through 7 wherein the valve damper may control a waste gate passage in the turbine housing.

Variation 9 may include a turbocharger assembly as set forth in any of variations 3 through 8 wherein the terminus may be positioned outside the opening.

Variation 10 may include a turbocharger assembly as set forth in any of variations 3 through 9 wherein at least one of the pin and the arm is made of a material containing a self-lubricating constituent.

The above description of select variations within the scope of the invention is merely illustrative in nature and, thus, variations or variants thereof are not to be regarded as a departure from the spirit and scope of the invention.

What is claimed is:

1. A turbocharger assembly comprising: a turbine housing defining a first flow path and a second flow path bypassing at least a part of the first flow path; a valve damper controlling flow through the second flow path; a valve shaft connected to the valve damper and extending out of the turbine housing; a lever connected to the valve shaft; a pin connected to and extending away from the lever; wherein the pin has a first section that is shaped as a frustum, and wherein the first section has a base that has a first diameter and the first section has a terminus opposite the base that has a second diameter that is smaller than the first diameter, and wherein the pin has a second cylindrical section that extends from the terminus, the second cylindrical section has a third diameter that is equal to the second diameter, wherein an annular groove is formed in the second cylindrical section; a first cylindrical section of the pin extends between the base and the lever, wherein the first cylindrical section has a fourth diameter that is larger than the first diameter; an actuator is mounted on the turbocharger assembly; an arm extends from the actuator and has an end with a first side and a second side; a conical opening is formed completely through the arm near the end from the first side to the second side, and the conical opening is tapered completely through the arm from the first side to the second side; the pin extends through the conical opening so that the first section engages the arm completely through the arm in conical opening; a spring element is engaged in the groove and engages the second side of the arm, and the spring element applies a force pulling the pin into the conical opening and compensating for wear between the pin and the arm by maintaining contact between the pin and the arm under the force; wherein the first cylindrical section is positioned on the first side of the arm and the spring has an operational bandwidth that maintains the force on the pin when the first cylindrical section is spaced away from the first side of the arm so that the first section contacts the arm in the conical opening, and wherein the operational bandwidth maintains the force on the pin when the first cylindrical section contacts the first side of the arm as a result of wear.

2. The turbocharger assembly according to claim 1 wherein the annular groove is spaced away from the first side of the arm.

3. The turbocharger assembly according to claim 1 wherein the spring includes an inner periphery captured in the annular grove and an outer periphery that applies the force to the second side of the arm.

4. The turbocharger assembly according to claim 1 wherein the first cylindrical section is configured to act as a stop and prevent movement of the pin into the conical opening when the first cylindrical section contacts the first side of the arm.

5. The turbocharger assembly according to claim 1 wherein the first section extends completely through the arm and extends out of the arm from the first side and also extends out of the arm from the second side.

* * * * *